United States Patent Office 3,527,756
Patented Sept. 8, 1970

3,527,756
1-SEC-AMINOCYCLOPROPACYCLOALKANES
Jacob Szmuszkovicz, Kalamazoo, Mich., assignor to The Upjohn Company, Kalamazoo, Mich., a corporation of Delaware
No Drawing. Filed May 15, 1967, Ser. No. 638,611
Int. Cl. C07d 87/28
U.S. Cl. 260—246          19 Claims

ABSTRACT OF THE DISCLOSURE

2-X-cycloalkanones, wherein X is selected from the group consisting of halo, mesyloxy and tosyloxy, are allowed to react with a secondary amine; 2-sec-aminocycloalkanone and 1,1-bis-sec - aminocyclopropacycloalkane are recovered from the reaction mixture. The 1,1-bis-sec-aminocyclopropacycloalkane can be hydrogenated, catalytic hydrogenation yielding known sec-aminocycloalkanes, and borohydride hydrogenolysis yielding novel 1-sec-aminocyclopropacycloalkanes having utility as tertiary amines, as central nervous system stimulants, and as anorexigenic agents.

BRIEF SUMMARY OF THE INVENTION

The invention relates to novel compounds and to a process for the preparation of the same and is particularly directed to novel 1-sec-aminocyclopropacycloalkanes, to a process for preparing the same, and to novel intermediates produced in the process.

The novel 1-sec-aminocyclopropacycloalkanes of the invention have the formula:

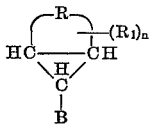
                    I wherein R is polymethylene of 3 to 7 carbon atoms, $R_1$ is alkyl of not more than 4 carbon atoms, $n$ is zero or an integer not greater than 4, and B is a secondary amino radical selected from the group consisting of (a) dilower-alkylamino, wherein each alkyl group has from 1 to 4 mono- and polyalkyl substituted piperidino, pyrrolidino, carbon atoms, inclusive and (b) cyclic secondary amino selected from the class consisting of unsubstituted and morpholino, thiamorpholino, piperazino, hexamethyleneimino, heptamethyleneimino, octamethyleneimino and homomorpholino, and wherein each alkyl group attached to said substituted cyclic secondary amino group is of from 1 to 4 carbon atoms, inclusive.

The novel compounds of the invention are prepared by hydrogenolysis of a 1,1-bis-sec-aminocyclopropacycloalkane with a borohydride, for example, sodium or like alkali metal borohydride. The process is illustrated in the following equation:

(A)
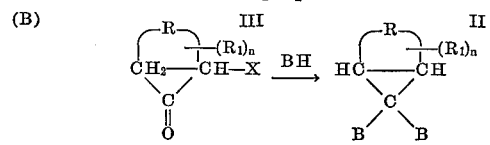

The starting 1,1-bis-sec-aminocyclopropacycloalkane can be prepared by reacting a 2-X-cycloalkanone having 6 to 10 nuclear carbon atoms and up to 4 alkyl substituents of not more than 4 carbon atoms each and X is the same as above, with a secondary amine having the formula B—H, wherein B is the same as above. The process is illustrated in the following equation:

(B)
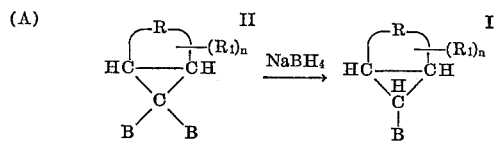

wherein X, R, $R_1$, $n$ and B are as given above.

DETAILED DESCRIPTION

The first step in the process for the preparation of 1-sec-aminocyclopropacycloalkanes of the invention involves the reaction of a 2-X-cycloalkanone with secondary amines as illustrated in Equation B supra. The reaction takes place over a wide range of temperatures, say from about $-10°$ C. to about $120°$ C. At lower temperatures the reaction may be inordinately slow and at higher temperatures side reactions leading to other types of products are favored. The reaction, for example, ordinarily also produces 2-sec-aminocycloalkanones of the formula:

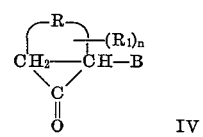
            IV and some 1,2- and 2,3-di-sec.amino-1-cycloalkenes of the formulas:

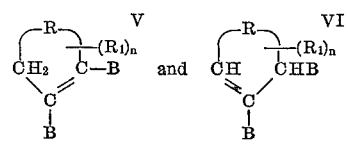

are formed. The formation of these by-products can ordinarily be minimized by keeping the amount of unreacted 2-X-cycloalkanone in the reaction mixture at a minimum, as for example, by incrementally adding the 2-X-cycloalkanone to the reaction mixture, or by effecting the reaction at a low temperature, that is, below the ambient temperature, in the presence of a solvent for 2-X-cycloalkanone and the secondary amine. Suitable such solvents include ether, tetrahydrofuran, dioxane, and the like. The desired product can be recovered from the reaction mixture by usual methods, such as, crystallization, distillation, or solvent extraction. Advantage can be taken of the volatility and solvent solubility of the free base. For example, the reaction mixture, after removal of solvent if any, and after being made alkaline if necessary, can be extracted with a solvent, for example, ether, chloroform, methylene chloride, and the like, the solvent removed, and the extract (residue) fractionally distilled.

Suitable starting 2-X-cycloalkanones include 2-chloro- and 2-bromocyclohexanone, 2-mesyloxy- and 2-tosyloxy-cyclohexanone, 2 - chloro- and 2 - bromo-4-methylcyclohexanone, 2 - chloro- and 2 - bromo-5-methylcyclohexanone, 2 - chloro- and 2 - bromo-3,5-dimethylcyclohexanone, 2 - chloro- and 2 - bromo-3,3-dimethylcyclohexanone, 2 - chloro- and 2 - bromo-5,5-dimethylcyclohexanone, 2 - chloro- and 2-bromo-3,5,5-trimethylcyclohexanone, 2 - chloro- and 2-bromo-3,3,5,5-tetramethylcyclohexanone, 2 - chloro- and 2-bromo-4-tertiarybutylcyclohexanone, 2 - chloro- and 2 - bromocycloheptanone, 2-chloro - and 2 - bromocyclooctanone, 2 - chloro- and 2-bromocyclononanone, and 2-chloro- and 2-bromocyclodecanone. Suitable starting secondary amines are dilower-alkylamines, for example, dimethylamine, diethylamine, dipropylamine, diisopropylamine, dibutylamine, diisobutylamine, di-sec-butylamine, di-tert-butylamine, or cyclic secondary amines of the formula

wherein $R_2$ is lower alkylene, lower azaalkylene, lower oxaalkylene or lower thiaalkylene attached to the nitrogen by carbon atoms separated by at least 2 atoms, for example, piperidine, pyrrolidine, morpholine, thiamorpholine, piperazine, hexamethyleneimine, heptamethyleneimine, octamethyleneimine, homomorpholine, 2-methylhexamethyleneimine, 2,2-dibutylhexamethyleneimine, 3,6-dimethylhexamethyleneimine, 2-ethylmorpholine, 2-ethyl-5-methylmorpholine, 3,3-dimethylmorpholine, 3-methylthiamorpholine, 2,3,4,5-tetramethylthiamorpholine, 2,3,6-trimethylthiamorpholine, 4-butylpiperazine, 4-isopropylpiperazine, 2,2,4,5,5 - pentamethylpiperazine, 2,5 - diisobutylpiperazine, 2,4,5 - trimethylpiperazine, 2-methylpiperidine, 3-methylpiperidine, 4-methylpiperidine, 2 - butylpiperidine, 2-propylpiperidine, 4-isopropylpiperidine, 3,4-diethylpiperidine, 2-sec-butylpyrrolidine, 2,2-dimethylpyrrolidine, 2-ethylpyrrolidine, 3,4 - dimethylpyrrolidine, and 2-isopropylpyrrolidine.

By reacting these 2-X-cycloalkanones with these secondary amines there are obtained 1,1 - bis-(dimethylamino)-, 1,1 - bis-(diethylamino)-, 1,1 - bis-(dipropylamino)-, 1,1 - bis-diisopropylamino)-, 1,1-bis-(dibutylamino)-, 1,1-bis-(diisobutylamino)-, 1,1-bis-(di-sec-butylamino)-, 1,1 - bis-(di-tert-butylamino)-, 1,1 - bis-piperidino-, 1,1 - bis-pyrrolidino-, 1,1-bis-morpholino-, 1,1-bis-thiamorpholino-, 1,1-bis-piperazino-, 1,1-bis-hexamethyleneimino-, 1,1 - bis-heptamethyleneimino-, 1,1-bis-octamethyleneimino-, 1,1 - bis-homomorpholino-, 1,1-bis-(2-methylhexamethyleneimino)-, 1,1 - bis-(2,2-dibutylhexamethyleneimino)-, 1,1 - bis-(3,6-dimethylhexamethyleneimino)-, 1,1-bis-(2-ethylmorpholino)-, 1,1 - bis-(2-ethyl-5-methylmorpholino)-, 1,1-bis - (3,3 - dimethylmorpholino)-, 1,1 - bis - (3-methylthiamorpholino)-, 1,1 - bis-(2,3,4,5 - tetramethylthiamorpholino)-, 1,1 - bis-(2,3,6-trimethylthiamorpholino)-, 1,1 - bis-(4-butylpiperazino)-, 1,1 - bis - (4 - isopropylpiperazino)-, 1,1-bis-(2,2,4,5,5-pentamethylpiperazino)-, 1,1 - bis - (2,5-diisobutylpiperazino)-, 1,1-bis-(2,4,5-trimethylpiperazino)-, 1,1-bis-(2-methylpiperidino)-, 1,1-bis - (3-methylpiperidino)-, 1,1-bis - (4 - methylpiperidino)-, 1,1-bis-(2-butylpiperidino)-, 1,1 - bis - (2 - propylpiperidino)-, 1,1-bis-(4-isopropylpiperidino)-, 1,1-bis - (3,4-diethylpiperidino)-, 1,1-bis-(2-sec-butylpyrrolidino)-, 1,1-bis - (2,2 - dimethylpyrrolidino)-, 1,1-bis - (2-ethylpyrrolidino)-, 1,1-bis - (3,4-dimethylpyrrolidino)-, 1,1-bis - (2 - isopropylpyrrolidino)-cyclopropacyclopentane, cyclopropa - 4 - methylcyclopentane, cyclopropa - 3 - methylcyclopentane, cyclopropa - 3,5 - dimethylcyclopentane, cyclopropa - 3,3 - dimethylcyclopentane, cyclopropa - 3,5,5 - trimethylcyclopentane, cyclopropa - 3,3,5,5 - tetramethylcyclopentane, cyclopropa - 4 - tert - butylcyclopentane, cyclopropacyclohexane, cyclopropacycloheptane, cyclopropacyclooctane, and cyclopropacyclononane.

The second step in the process for the preparation of 1-sec-aminocyclopropacycloalkanes of the invention involves a borohydride reduction (hydrogenolysis) of the 1,1 - bis-sec-aminocyclopropacycloalkanes as illustrated in Equation A, supra. The reaction advantageously is carried out in a solvent, for example, ethanol, methanol, isopropanol, t-butanol, and water. It is not ordinarily necessary or advisable to heat or cool the reaction mixture. However, temperatures ranging from about 0° C. to about 80° C. can be used if desired. The product can be recovered by ordinary techniques of crystallization, distillation, and solvent extraction. Advantage can be taken of the greater water-solubility of the hydrochloride and the greater volatility and solvent-solubility of the free base in effecting the recovery. For example, the reaction mixture can be distilled to remove solvent, the residue extracted with a solvent, for example, ether, chloroform, methylene chloride, or the like, the product converted to the hydrochloride and extracted with water, then to the free base and extracted again with solvent, and finally distilled, after removal of the solvent.

By reacting the 1,1-bis-sec-aminocyclopropacycloalkanes with a borohydride, there are obtained 1-(dimethylamino)-,
1-(diethylamino)-,
1-(dipropylamino)-,
1-(diisopropylamino)-,
1-(dibutylamino)-,
1-(diisobutylamino)-,
1-(di-sec-butylamino)-,
1-(di-tert-butylamino)-,
1-piperidino,
1-pyrrolidino,
1-morpholino,
1-thiamorpholino-,
1-piperazino-,
1-hexamethyleneimino-,
1-heptamethyleneimino-,
1-octamethyleneimino-,
1-homomorpholino-,
1-(2-methylhexamethyleneimino)-,
1-(2,2-dibutylhexamethyleneimino)-,
1-(3,6-dimethylhexamethyleneimino)-,
1-(2-ethylmorpholino)-,
1-(2-ethyl-5-methylmorpholino)-,
1-(3,3-dimethylmorpholino)-,
1-(3-methylthiamorpholino)-,
1-(2,3,4,5-tetramethylthiamorpholino)-,
1-(2,3,6-trimethylthiamorpholino)-,
1-(4-butylpiperazino)-,
1-(4-isopropylpiperazino)-,
1-(2,2,4,5,5-pentamethylpiperazino)-,
1-(2,5-diisobutylpiperazino)-,
1-(2,4,5-trimethylpiperazino)-,
1-(2-methylpiperidino)-,
1-(3-methylpiperidino)-,
1-(4-methylpiperidino)-,
1-(2-butylpiperidino)-,
1-(2-propylpiperidino)-,
1-(4-isopropylpiperidino)-,
1-(3,4-diethylpiperidino)-,
1-(2-sec-butylpyrrolidino)-,
1-(2,2,-dimethylpyrrolidino)-,
1-(2-ethylpyrrolidino)-,
1-(3,4-dimethylpyrrolidino)-, and
1-(2-isopropylpyrrolidino)-cyclopropacyclopentane,
cyclopropa-4-methylcyclopentane,
cyclopropa-3-methylcyclopentane,
cyclopropa-3,5-dimethylcyclopentane,
cyclopropa-3,3-dimethylcyclopentane,
cyclopropa-3,5,5-trimethylcyclopentane,
cyclopropa-3,3,5,5-teramethylcyclopentane,
cyclopropa-4-tert-butylcyclopentane,
cyclopropacyclohexane,
cyclopropacycloheptane,
cyclopropacyclooctane, and
cyclopropacyclononane.

The borohydride reduction can also be applied to the by-product 1,2- and 2,3-bis-sec-aminocycloalkenes of Formulas V and VI to yield novel 1,2-bis-sec-aminocycloalkanes of the formula:

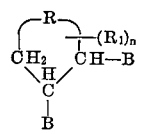

VII

Thus by reacting with borohydride the 1,2- and 2,3-bis-sec-aminocycloalkenes corresponding to the above 1,1-bis-sec-aminocyclopropacycloalkanes, there are obtained 1,2-bis-(dimethylamino)-,
1,2-bis-(diethylamino)-,
1,2-bis-(dipropylamino)-,
1,2-bis-(diisopropylamino)-,
1,2-bis-(dibutylamino)-,
1,2-bis-(diisobutylamino)-,
1,2-bis-(di-sec-butylamino)-,
1,2-bis-(di-tert-butylamino)-,
1,2-bis-piperidino,
1,2-bis-pyrrolidino,
1,2-bis-morpholino,
1,2-bis-thiamorpholino-,
1,2-bis-piperazino-,
1,2-bis-hexamethyleneimino-,
1,2-bis-heptamethyleneimino-,
1,2-bis-octamethyleneimino-,
1,2-bis-homomorpholino-,
1,2-bis-(2-methylhexamethyleneimino)-,
1,2-bis-(2,2-dibutylhexamethyleneimino)-,
1,2-bis-(3,6-dimethylhexamethyleneimino)-,
1,2-bis-(2-ethylmorpholino)-,
1,2-bis-(2-ethyl-5-methylmorpholino)-,
1,2-bis-(3,3-dimethylmorpholino)-,
1,2-bis-(3-methylthiamorpholino)-,
1,2-bis-(2,3,4,5-tetramethylthiamorpholino)-,
1,2-bis-(2,3,6-trimethylthiamorpholino)-,
1,2-bis-(4-butylpiperazino)-,
1,2-bis-(4-isopropylpiperazino)-,
1,2-bis-(2,2,4,5,5-pentamethylpiperazino)-,
1,2-bis-(2,5-diisobutylpiperazino)-,
1,2-bis-(2,4,5-trimethylpiperazino)-,
1,2-bis-(2-methylpiperidino)-,
1,2-bis-(3-methylpiperidino)-,
1,2-bis-(4-methylpiperidino)-,
1,2-bis-(2-butylpiperidino)-,
1,2-bis-(2-propylpiperidino)-,
1,2-bis-(4-isopropylpiperidino)-,
1,2-bis-(3,4-diethylpiperidino)-,
1,2-bis-(2-sec-butylpyrrolidino)-,
1,2-bis-(2,2-dimethylpyrrolidino)-,
1,2-bis-(2-ethylpyrrolidino)-,
1,2-bis-(3,4-dimethylpyrrolidino)-, and
1,2-bis-(2-isopropylpyrrolidino)-cyclohexane,
4-methylcyclohexane,
3-methylcyclohexane,
3,5-dimethylcyclohexane,
3,3-dimethylcyclohexane,
3,5,5-trimethylcyclohexane,
3,3,5,5-tetramethylcyclohexane,
4-tert-butylcyclohexane,
cycloheptane,
cyclooctane,
cyclononane, and
cyclodecane.

The novel compounds of the invention as represented by Formula I and Formula VII are tertiary nitrogen bases and as such are useful substitutes for basic tertiary amines such as pyridine and trimethylamine. They are useful, for example, for scavenging hydrochloric acid in chemical reactions and in biological systems, as buffers, and as carriers for toxic acids. They also have pharmacodynamic activity, for example, anorexigenic and central nervous system stimulant activity and can be used in animals at least, as an appetite suppressant and for the alleviation of anaphylactic shock.

The 1,1-bis-sec-aminocyclopropacycloalkanes of Formula II are also useful as intermediates for making known sec-aminocycloalkanes. Thus on catalytic hydrogenation, for example in the presence of 10% palladium-on-carbon or 5% rhodium-on-carbon the corresponding sec-amino-cycloalkanes are obtained according to the following equation:

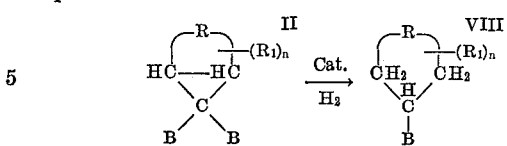

The compounds of Formulas I, IV, VII, and VIII exist either in the protonated or non-protonated forms according to the pH of the environment. When the protonated form is intended the compound is qualified as the acid addition salt; when the non-protonated form is intended it is qualified as the free base. The free bases can be converted to stable acid addition salts by neutralizing the free base with the appropriate acid to below about pH 7.0, and advantageously to about pH 2 to pH 6. Suitable acids for this purpose include hydrochloric, sulfuric, phosphoric, thiocyanic, fluosilicic, hexafluoroarsenic, hexafluorophosphoric, acetic, succinic, citric, lactic, maleic, fumaric, pamoic, cholic, palmitic, mucic, camphoric, glutaric, glycolic, phthalic, tartaric, lauric, stearic, salicylic, 3-phenylsalicylic, 5-phenylsalicylic, 3-methylglutaric, ortho-sulfobenzoic, cyclopentanepropionic, 1,2-cyclohexanedicarboxylic, 4-cyclohexanecarboxylic, octadecenylsuccinic, octenylsuccinic, methanesulfonic, benzenesulfonic, helianthic, Reinecke's, dimethyldithiocarbamic, cyclohexysulfamic, hexadecylsulfamic, octadecylsulfamic, sorbic, monochloroacetic, undecylenic, 4'-hydroxyazobenzene-4-sulfonic, octyldecylsulfuric, picric, benzoic, cinnamic, and like acids.

The acid addition salts can be used for the same purposes as the free base or they can be employed to upgrade the same. For example, the free base can be converted to an insoluble salt, such as the picrate, which can be subjected to purification procedures, for example, solvent extractions and washings, chromatography, fractional liquid-liquid extractions, and crystallization and then used to regenerate the free base form by treatment with alkali or to make a different salt by metathesis. Or the free base can be converted to a water-soluble salt, such as the hydrochloride or sulfate, and the aqueous solution of the salt extracted with various water-immiscible solvents before regenerating the free base form by treatment of the thus-extracted acid solution or converted to another salt by metathesis. The free bases can be used as a buffer or as an antacid. The thiocyanic acid addition salt when condensed with formaldehyde forms resinous materials useful as inhibitors according to U.S. Pats. 2,425,320 and 2,606,155 in the acid pickling of steel. The free bases also make good vehicles for toxic acids. For example, the fluosilicic acid addition salts are useful as mothproofing agents according to U.S. Pats. 1,915,334 and 2,075,359, and the hexafluoroarsenic acid and hexafluorophosphoric acid addition salts are useful as parasiticides according to U.S. Pats. 3,122,536 and 3,122,552.

The compounds of Formulas I, IV, VII, and VIII also form salts with penicillins. These salts have the same antibacterial activity as the penicillins but different solubility characteristics which make them useful in situations indicated by the special solubility characteristics and in the isolation and purification of the penicillins, particularly benzyl penicillin. Said salts can be formed either by neutralization of the free base form of a compound with the free acid form of a penicillin, or by a metathetical exchange of the anion of an acid addition salt of the compound, for example, the chloride ion of a hydrochloride, with the anionic form of a penicillin.

The free bases of Formulas I, IV, VII and VIII are useful as catalysts for reactions between isocyanates and active hydrogen compounds, e.g., alcohols and amines, and are especially useful as catalysts for the formation of polyurethanes, e.g., polyurethane foams, by interaction of polyisocyanates and polyhydroxy compounds.

The compounds of Formula I are obtained in two isomeric forms, the endo and the exo forms. These two forms are represented sterically as follows:

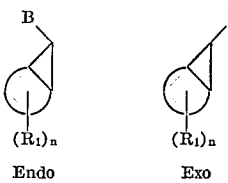

Endo       Exo

In the process of this invention the endo form is produced predominately. For example, on hydrogenolysis with sodium borohydride of 1,1-bis-piperidinocyclopropacyclopentane, there is obtained about 95 percent of 1-endo-piperidinocyclopropacyclopentane (6 - endo - piperidinobicyclo[3.1.0]hexane) and about 5 percent of the exo form. The two forms are useful for the same purposes and are not ordinarily separated. If desired, however, they can be separated by gas chromatography or fractional liquid-liquid extraction.

The following examples are illustrative of the process and products of the present invention but are not to be construed as limiting. The parts and percentages are by weight and the solvent ratios are by volume unless otherwise specified.

EXAMPLE 1

1-piperidinocyclopropacyclopentane(6-piperidinobicyclo[3.1.0]hexane)

(A) 1,1-bis-piperidinocyclopropacyclopentane(6,6 - bis-piperidinobicyclo[3.1.0]hexane)

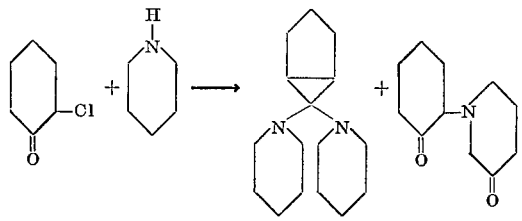

2-chlorocyclohexanone (265 g.; 2 moles) was added during 12 min. to piperidine (680 g.; 8 moles) preheated to 90° C. in a 3-liter flask, with stirring and under nitrogen. The vigorous reflux was controlled by occasional cooling with a cold water bath. As soon as the temperature dropped to below 100° C., the suspension was heated on the steam bath for 2 hr. and then allowed to stand overnight. The suspension was cooled in ice, 500 ml. of water was added, and the whole was added to an ice cold solution of sodium carbonate (300 g.) in 2 l. of water. The mixture was extracted with ether (5× 400 ml.). The ether extract was washed with 200 ml. of water, 200 ml. of saturated sodium chloride solution, dried over magnesium sulfate, and evaporated. Distillation at 13 mm. through a 24" Nester-Faust spinning band column afforded fractions as follows:

(1) B.P. 30° C., 45.3 g. (mostly piperidine).
(2) B.P. 30–128° C., 6.4 g. (not investigated).
(3) B.P. 128–130° C., 147 g. (41 percent yield) of 2-piperidinocyclohexanone; characterized as the hydrochloride, M.P. 213.5–215° C., after crystallization from methanol-ether.
(4) B.P. 132–150° C., 34.2 g. (not investigated).

The pot residue (214 g.) was distilled twice at 0.02 mm. through a short Vigreux column; 171.2 g. (34.4 percent yield) of 1,1-bis-piperidinocyclopropacyclopentane (6,6-bis-piperidinobicyclo[3.1.0]hexane).

A sample was crystallized twice from petroleum ether at −70° C.; M.P. 41–42° C.

*Analysis.*—Calcd. for $C_{16}H_{28}N_2$ (percent): C, 77.36; H, 11.36; N, 11.28. Found (percent): C, 77.18; H, 11.19; N, 11.11.

The above reaction was run adding 2-chlorocyclohexanone to piperidine. When the piperidine was added to the 2-chlorocyclohexanone instead, the yield of 1,1-bis-piperidinocyclopropacyclopentane was increased from 34 percent to 59 percent.

(B) 1-piperidinocyclopropacyclopentane (6-piperidinobicyclo[3.1.0]hexane)

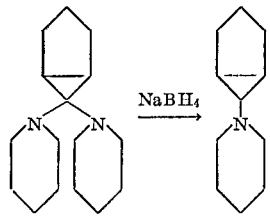

The solid 1,1 - bis - piperidinocyclopropacyclopentane (6,6-bis-piperidinobicyclo[3.1.0]hexane) of part A (95 g.; 0.382 mole) was added to a stirred solution of sodium borohydride (95 g.) in 2400 ml. of ethanol under nitrogen. The mixture was stirred for 18 hrs. The solvent was evaporated on the steam bath and 1880 ml. was collected. The residue from distillation was stirred 1 hr. with 1 liter each of water and ether. The ether layer was separated and stirred 1 hr. with 800 ml. of 10 percent aqueous hydrochloric acid. The acid layer was separated, cooled in ice and basified with 20 percent aqueous sodium hydroxide. The mixture was extracted thrice with ether (about 1,500 ml.), the ether solution was washed with saturated aqueous sodium chloride solution, dried over magnesium sulfate, and evaporated to give 44 g. of crude product. Distillation through a 24" Nester-Faust spinning band column afforded 33.5 g. (53 percent yield) of 1-piperidino cyclopropacyclopentane (6 - piperidinobicyclo[3.1.0]hexane) boiling at 88–92° C. (14 mm.).

*Analysis.*—Calcd. for $C_{11}H_{19}N$ (percent): C, 79.94; H, 11.59; N, 8.48. Found (percent): C, 79.71; H, 11.34; N, 8.74.

(C) Hydrochloride: Ethereal hydrogen chloride (300 ml. of 0.17 N solution) was added during 5 min. to a solution of 1-piperidinocyclopropacyclopentane (6-piperidinobicyclo[3.1.0]hexane) (10 g.; 0.061 mole) in 125 ml. of ether. The suspension was filtered after 0.5 hr., and the solid was washed with ether. Crystallization from 30 ml. of methanol and 400 ml. of ether gave 4.8 g. of 1-piperidinocyclopropacyclopentane hydrochloride, M.P. 212–213° C., unchanged on recrystallization.

*Analysis.*—Calcd. for $C_{11}H_{19}N \cdot HCl$ (percent): C, 65.49; H, 9.99; Cl, 17.58; N, 6.94. Found (percent): C, 65.68; H, 9.97; Cl, 17.74; N, 7.04.

EXAMPLE 2

1 - (methylpiperazino)cyclopropacyclopentane (1-bicyclo[3.1.0]hex-6-yl-4-methylpiperazine)

(A) Condensation of 2-chlorocyclohexanone with N-methylpiperazine

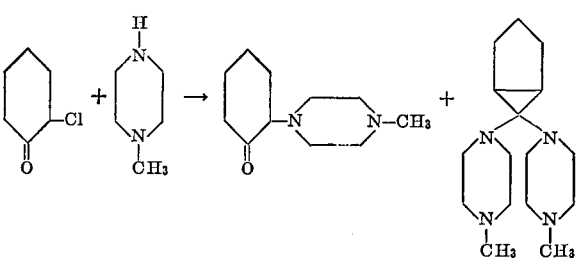

2-chlorocyclohexannone (132.6 g.; 1 mole) was added during 5 min. to N-methylpiperazine (400.4 g.; 4 moles) preheated to 90° C. At the end of addition heating was stopped, the temperature rose to 120° C., and the reaction mixture solidified. It was allowed to stand overnight, cooled in ice, and 500 ml. of water was added, followed by a solution of 150 g. of sodium carbonate in 1 liter of water. The mixture was extracted with ether, the ether extract was washed with water, saturated with sodium chloride solution, dried over magnesium sulfate, and evaporated. The residue (123.7 g.) was distilled at 0.5 mm. through a 7" Vigreux column to give the following fractions:

(1) B.P. 90–117° C., 7.8 g. of 2-(4-methylpiperazino)-cyclohexanone (66.2% pure).
(2) B.P. 117–120° C., 95.1 g. (34% yield) of 1,1-bis-(4-methylpiperazino)cyclopropacyclopentane.

Analysis.—Calcd. for $C_{16}H_{30}N_4$ (percent): C, 69.01; H, 10.86; N, 20.13. Found (percent): C, 68.56; H, 11.28; N, 20.24.

A sample was crystallized from petroleum ether at —70° C.; M.P. 44–46° C.

Analysis.—Calcd. for $C_{16}H_{30}N_4$ (percent): C, 69.01; H, 10.86; N, 20.13. Found (percent): C, 68.71; H, 11.09; N, 20.53.

This reaction was repeated on the same scale but after the addition of 2-chlorocyclohexanone the mixture was heated on the steam bath for 2 hrs. Distillation afforded 43% yield of 2-(4-methylpiperazino)cyclohexanone (92.1% pure) and 28% yield of 1,1-bis-(4-methylpiperazino)cyclopropacyclopentane.

A solution of 2-(4-methylpiperazino)cyclohexane (80 g.) in 400 ml. of ether was added to a solution of 218 g. of 30% hydrobromic acid in acetic acid diluted to 1,500 ml. with ether. The resulting precipitate, 2-(4-methylpiperazino)cyclohexanone dihydrobromide, was crystallized from ethanol-ether; M.P. 235° C. (effervescence).

Analysis.—Calcd. for $C_{11}H_{20}N_2O \cdot 2HBr$ (percent): C, 36.89; H, 6.19; Br, 44.63; N, 7.82. Found (percent): C, 36.84; H, 6.51; Br, 44.76; N, 8.16.

(B) hydrogenolysis with NaBH₄

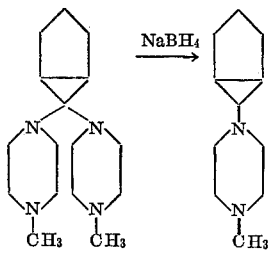

1,1-bis-(4-methylpiperazino)cyclopropacyclopentane (55.7 g.; 0.2 mole) was added to a suspension of sodium borohydride (55.7 g.) in 1400 ml. of ethanol, and the mixture was stirred overnight. It was then evaporated, and the residue was stirred with 600 ml. each of water and ether. The ether layer was separated and stirred for 30 min. with 500 ml. of 10% hydrochloric acid. The acid layer was separated, cooled and basified with 20% aqueous sodium hydroxide solution. The mixture was extracted with ether, the ether extract was washed with saturated aqueous sodium chloride solution, dried over magnesium sulfate, and evaporated to give 4.8 g. of a brown oil. Distillation at 14 mm. afforded 2.2 g. (6% yield) of crude 1-(4-methylpiperazino)cyclopropacyclopentane, B.P. 105–115° C. The dihydrochloride was prepared by adding a 10 ml. of 1.7 N ethereal hydrogen chloride to an ethereal solution of 2 g. of the above distilled base. The resulting solid dihydrochloride (M.P. 201–203° C.) was crystallized from ethanolether to give 1.4 g. of unchanged melting point.

Analysis.—Calcd. for $C_{11}H_{20}N_2 \cdot 2HCl \cdot 0.5H_2O$ (percent): C, 50.83; H, 8.84; N, 10.68. Found (percent): C, 49.93; H, 9.29; N, 10.16.

EXAMPLE 3

1,1-bis-morpholinocyclopropacyclopentane

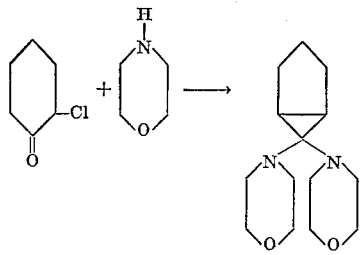

Morpholine (174 g.; 2 moles) was added during 40 min. to a solution of 2-chlorocyclohexanone (66.1 g.; 0.5 mole) in 500 ml. of ether cooled in ice, keeping the temperature below 5° C. The mixture was then stirred for 1 hr. in the cold and overnight at room temperature. It was cooled to 5° C. and 150 ml. of water was added, followed by a solution of 75 g. of sodium carbonate in 1 liter of water. The mixture was stirred for 30 min., the ether layer was separated, and the aqueous layer was extracted with methylene chloride (3× 200 ml.). The combined organic extract was washed with saturated sodium chloride solution, dried over magnesium sulfate, and evaporated to give a yellow oil. Distillation at 0.2 mm. gave the following fractions:

(1) B.P. 44–46° C., 24.9 g., 2-chlorocyclohexanone of 90.8% purity.
(2) B.P. 46–100° C., 1.0 g. (discarded).
(3) B.P. 100–101° C., 12 g., a mixture of 2-morpholinocyclohexanone and the corresponding morpholine enamine.
(4) B.P. 101–125° C., 26 g. (discarded).
(5) B.P. 125–131° C., 19.4 g. (15% yield) of 1,1-bis-morpholinocyclopropacyclopentane (6,6-bis-morpholinobicyclo[3.1.0]hexane).

Crystallization of fraction 5 from ether gave colorless prisms, M.P. 97–99° C., unchanged on recrystallization.

Analysis.—Calcd. for $C_{14}H_{24}N_2O_2$ (percent): C, 66.33; H, 9.59; N, 11.10. Found (percent): C, 56.54; H, 9.68; N, 11.24.

EXAMPLE 4

1-pyrrolidinocyclopropacyclopentane (6-pyrrolidinobicyclo[3.1.0]hexane)

(A) 1,1-bis-pyrrolidinocyclopropacyclopentane (6,6-bispyrrolidinobicyclo[3.1.0]hexane)

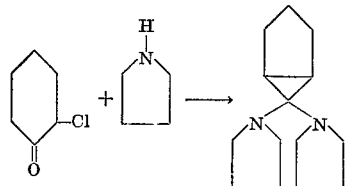

Pyrrolidine (142 g., 2 moles) was added during 40 min. to a solution of 2-chlorocyclohexanone (66.1 g., 0.5 mole) in 500 ml. of ether so that the temperature was at 3° C. to 6° C. The mixture was then stirred for 1 hr. in the cold, and at room temperature for 16 hr. It was then cooled in ice, 150 ml. of water was added, followed by a solution of 75 g. of sodium carbonate in 1 liter of water. The mixture was stirred for 30 min. and extracted with methylene chloride (4× 100 ml.) and ether (200 ml.). The organic extract was washed with saturated aqueous sodium chloride solution, dried over magnesium sulfate, and evaporated. The resulting brown oil was distilled at 0.03 mm. through a 4" Vigreux column to give fraction 1, 72.36 g., B.P. 75–78° C., analyzing 93.00% 1,1-bis-pyrrolidinocyclopropacyclopentane, and fraction 2, 30.6 g., B.P. 78–88° C., analyzing 97% 1,1-bis-pyrrolidinocyclopropacyclopentane. Total yield of crude 1,1 - bis - pyrrolidinocyclopropacyclopentane was 94%. A sample was crystallized twice from petroleum ether at −70° C. to give colorless crystals, M.P. 36–37° C.

*Analysis.*—Calcd. for $C_{14}H_{24}N_2$ (percent): C, 76.31; H, 10.98; N, 12.71. Found (percent): C, 76.15; H, 11.19; N, 12.30.

(B) 1-pyrrolidinocyclopropacyclopentane (6-pyrrolidinobicyclo[3.1.0]hexane)

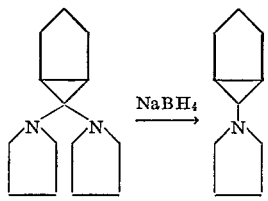

1,1 - bis - pyrrolidinocyclopropacyclopentane (55.6 g.; 0.253 mole) was added to a suspension of sodium borohydride (55.6 g.) in 1400 ml. of ethanol, and the mixture was stirred for 20 hours. It was then evaporated, and the residue was stirred with 400 ml. each of water and ether. The layers were separated and the aqueous layer was extracted with ether (2× 200 ml.). The ether fractions were combined and stirred for 30 min. with 400 ml. of 10% hydrochloric acid. The acid layer was separated, cooled and basified with 20% aqueous sodium hydroxide solution. The mixture was extracted with methylene chloride (4× 200 ml.) and then with ether (100 ml.). The extracts were combined and washed with saturated aqueous sodium chloride solution, dried over magnesium sulfate, and evaporated to give 27 g. of oil. Distillation of this oil at 12 mm. afforded 46% yield of 6-pyrrolidinobicyclo[3.1.0]hexane, B.P. 74–75° C.

*Analysis.*—Calcd. for $C_{10}H_{17}N$ (percent): C, 79.40; H, 11.34; N, 9.26. Found (percent): C, 79.36; H, 11.62; N, 9.35.

(C) Oxalate: A solution of the base of part B (1.5 g.; 0.01 mole) in 20 ml. of ether was added to a solution of oxalic acid (0.9 g.; 0.01 mole) in 50 ml. of ether. The resulting solid (2.2 g., M.P. 115–125° C.) was crystallized twice from ethanol-ether to give 1.2 g. of 1-pyrrolidinocyclopropacyclopentane oxalate, M.P. 138–140° (effervescence).

*Analysis.*—Calcd. for $C_{10}H_{17}N \cdot C_2H_2O_4$ (percent): C, 59.73; H, 7.94; N, 5.81. Found (percent) C, 59.66; H, 8.04; N, 5.78.

I claim:

1. A compound of the formula

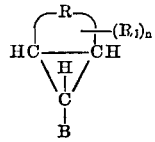

I wherein R is polymethylene of 3 to 7 carbon atoms, $R_1$ is alkyl of not more than 4 carbon atoms, $n$ is zero or an integer not greater than 4, and B is a secondary amino radical selected from the group consisting of (a) diloweralkylamino, wherein each alkyl group has from 1 to 4 carbon atoms, inclusive and (b) cyclic secondary amino selected from the class consisting of unsubstituted and mono- and polyalkyl substituted piperidino, pyrrolidino, morpholino, thiamorpholino, piperazino, hexamethyleneimino, heptamethyleneimino, octamethyleneimino, and homomorpholino, wherein each alkyl group attached to said substituted cyclic secondary amino group is of from 1 to 4 carbon atoms, inclusive.

2. A compound of claim 1 wherein B is piperidino.
3. A compound of claim 1 wherein B is pyrrolidino.
4. A compound of claim 1 wherein B is 4-methylpiperazino.
5. A compound of claim 2 wherein R is trimethylene and $n$ is zero.
6. A compound of claim 3 wherein R is trimethylene and $n$ is zero.
7. A compound of claim 4 wherein R is trimethylene and $n$ is zero.
8. A compound of the formula

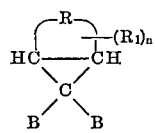

II wherein R is polymethylene of 3 to 7 carbon atoms, $R_1$ is alkyl of not more than 4 carbon atoms, $n$ is zero or an integer not greater than 4, and B is a secondary amino radical selecter from the group consisting of (a) diloweralkylamino, wherein each alkyl group has from 1 to 4 carbon atoms, inclusive and (b) cyclic secondary amino selected from the class consisting of unsubstituted and mono- and polyalkyl substittued piperidino, pyrrolidino, morpholino, thiamorpholino, piperazino, hexamethyleneimino, heptamethyleneimino, octamethyleneimino, and homomorpholino, wherein each alkyl group attached to said substituted cyclic secondary amino group is of from 1 to 4 carbon atoms, inclusive.

9. A compound of claim 8 wherein B is piperidino.
10. A compound of claim 8 wherein B is pyrrolidino.
11. A compound of claim 8 wherein B is 4-methylpiperazino.
12. A compound of claim 8 wherein B is morpholino.
13. A compound of claim 9 wherein R is trimethylene and $n$ is zero.
14. A compound of claim 10 wherein R is trimethylene and $n$ is zero.
15. A compound of claim 11 wherein R is trimethylene and $n$ is zero.
16. A compound of claim 12 wherein R is trimethylene and $n$ is zero.
17. The process of making compounds of the formula:

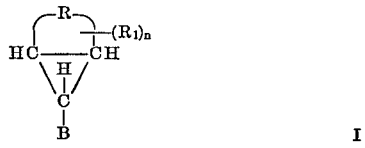

I wherein R is polymethylene of 3 to 7 carbon atoms, $R_1$ is alkyl of not more than 4 carbon atoms, $n$ is zero or an integer not greater than 4, and B is a secondary amino radical selected from the group consisting of (a) diloweralkylamino, wherein each alkyl group has from 1 to 4 carbon atoms, inclusive and (b) cyclic secondary amino selected from the class consisting of unsubstituted and mono- and polyalkyl substituted piperidino, pyrrolidino, morpholino, thiamorpholino, piperazino, hexamethyleneimino, heptamethyleneimino, octamethyleneimino, and homomorpholino, wherein each alkyl group attached to said substituted cyclic secondary amino group is of from 1 to 4 carbon atoms, inclusive, which comprises reacting a compound of the formula:

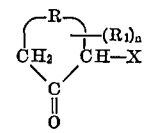

III wherein R, $R_1$, $n$ and B are as given above and X is selected from the group consisting of halo, mesyloxy, and tosyloxy, with a secondary amine having the formula, B—H, wherein B is as given above, to form a compound of the formula:

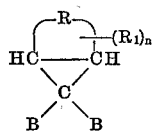

wherein R, $R_1$, n and B are as given above, and subjecting the formed compound to a borohydride hydrogenolysis.

18. The process of making compounds of the formula:

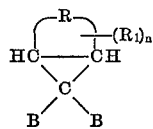

wherein R is polymethylene of 3 to 7 carbon atoms, $R_1$ is alkyl of not more than 4 carbon atoms, n is zero or an integer not greater than 4, and B is a secondary amino radical selected from the group consisting of (a) diloweralkylamino, wherein each alkyl group has from 1 to 4 carbon atoms, inclusive and (b) cyclic secondary amino selected from the class consisting of unsubstituted and mono- and polyalkyl substituted piperidino, pyrrolidino, morpholino, thiamorpholino, piperazino, hexamethyleneimino, heptamethyleneimino, octamethyleneimino, and homomorpholino, wherein each alkyl group attached to said substituted cyclic secondary amino group is of from 1 to 4 carbon atoms, inclusive, which comprises reacting a compound having the formula B—H, wherein B is as given above with a compound of the formula:

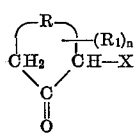

wherein X is selected from the group consisting of halo, mesyloxy and tosyloxy.

19. The process of making compounds of the formula:

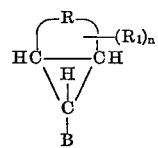

wherein R is polymethylene of 3 to 7 carbon atoms, $R_1$ is alkyl of not more than 4 carbon atoms, n is zero or an integer not greater than 4 and B is a secondary amino radical selected from the group consisting of (a) diloweralkylamino, wherein each alkyl group has from 1 to 4 carbon atoms, inclusive and (b) cyclic secondary amino selected from the class consisting of unsubstituted and mono- and polyalkyl substituted piperidino, pyrrolidino, morpholino, thiamorpholino, piperazino, hexamethyleneimino, heptamethyleneimino, octamethyleneimino, and homomorpholino, wherein each alkyl group attached to said substituted cyclic secondary amino group is of from 1 to 4 carbon atoms, inclusive, which comprises subjecting a compound of the formula:

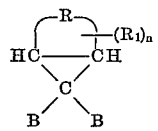

wherein R, $R_1$, n and B are as given above, to a borohydride hydrogenolysis.

References Cited

UNITED STATES PATENTS 3,258,469   6/1966   Blanchard et al. _____ 260—326.8

ALEX MAZEL, Primary Examiner

J. TOVAR, Assistant Examiner

U.S. Cl. X.R.

260—239, 243, 247, 268, 293, 326, 326.8, 326.81, 326.85, 333, 563; 424—244, 246, 248, 250, 267, 274, 325